(12) United States Patent
Fujino et al.

(10) Patent No.: US 11,150,138 B2
(45) Date of Patent: Oct. 19, 2021

(54) RADIATION THERMOMETER

(71) Applicant: HORIBA Advanced Techno, Co., Ltd., Kyoto (JP)

(72) Inventors: Sho Fujino, Kyoto (JP); Naohiro Ohsuga, Kyoto (JP)

(73) Assignee: HORIBA ADVANCED TECHNO, CO., LTD., Kyoto (JP)

( * ) Notice: Subject to any disclaimer, the term of this patent is extended or adjusted under 35 U.S.C. 154(b) by 0 days.

(21) Appl. No.: 16/201,274

(22) Filed: Nov. 27, 2018

(65) Prior Publication Data

US 2019/0178719 A1 Jun. 13, 2019

(30) Foreign Application Priority Data

Dec. 8, 2017 (JP) .............................. JP2017-235693

(51) Int. Cl.
*G01J 5/08* (2006.01)
*G01J 5/00* (2006.01)
*G01J 5/06* (2006.01)

(52) U.S. Cl.
CPC ........... *G01J 5/0862* (2013.01); *G01J 5/0007* (2013.01); *G01J 5/06* (2013.01)

(58) Field of Classification Search
CPC ........... G01J 5/0007; G01J 5/06; G01J 5/0862
See application file for complete search history.

(56) References Cited

U.S. PATENT DOCUMENTS

| 4,659,234 A | * | 4/1987 | Brouwer | ................... G01J 5/60 |
| | | | | 250/339.04 |
| 6,816,803 B1 | * | 11/2004 | Palfenier | ............... G01J 1/4204 |
| | | | | 374/E11.003 |

(Continued)

FOREIGN PATENT DOCUMENTS

| JP | 2756648 | 3/1998 |
| JP | 10-506712 | 6/1998 |

(Continued)

OTHER PUBLICATIONS

Notice of Reasons of Refusal, Japanese Patent Office, Application No. 2017-235693, dated Jul. 27, 2021, English translation.

*Primary Examiner* — Marcus H Taningco
(74) *Attorney, Agent, or Firm* — Greenblum & Bernstein, P.L.C.

(57) ABSTRACT

In order that a temperature of a measurement object whose non-transmission wavelength range is narrow, such as isopropyl alcohol can be measured highly accurately without increasing the size of a radiation thermometer, the radiation thermometer includes an infrared detection element to detect infrared ray emitted from the measurement object. The radiation thermometer is designed to measure the temperature of the measurement object on the basis of intensity of infrared ray detected by the infrared detection element. The radiation thermometer further includes a filter group made up of a plurality of infrared filters arranged on an optical path of infrared ray introduced into the infrared detection element. The filter group permits transmission of at least infrared ray in each of a first wavelength range and a second wavelength range which are not overlapped with each other.

6 Claims, 5 Drawing Sheets

(56) References Cited

U.S. PATENT DOCUMENTS

| | | | | |
|---|---|---|---|---|
| 2007/0177650 A1* | 8/2007 | Huston | ............... | G01J 5/0044 |
| | | | | 374/130 |
| 2008/0219722 A1* | 9/2008 | Sone | ............... | G03G 15/2007 |
| | | | | 399/328 |
| 2009/0037135 A1 | 2/2009 | Lyndon et al. | | |
| 2011/0110394 A1* | 5/2011 | Kaess | ............... | G01J 5/0014 |
| | | | | 374/121 |
| 2015/0048470 A1* | 2/2015 | Reinert | ............... | G01J 5/0806 |
| | | | | 257/432 |

FOREIGN PATENT DOCUMENTS

| | | | |
|---|---|---|---|
| JP | 2005003437 A * | 1/2005 | |
| JP | 2006-72898 | 3/2006 | |
| JP | 2017-83443 | 5/2017 | |
| WO | 96/10198 | 4/1996 | |

\* cited by examiner

RADIATION THERMOMETER

BACKGROUND OF THE INVENTION

Field of the Invention

The present invention relates to a radiation thermometer.

Background Art

A radiation thermometer is configured so that a temperature of a measurement object is measurable on the basis of detected intensity by detecting, through an infrared detection element, infrared ray emitted from the measurement object as disclosed in Patent Document 1.

In cases where a measurement object has, for example, a small film thickness, when infrared ray being emitted from a member located on the opposite side of the radiation thermometer across the measurement object has passed through the measurement object in the above configuration, measurement error occurs due to detection of the infrared ray.

The above measurement error can be reduced by using an infrared filter designed to cut off infrared ray in a transmission wavelength range that passes through the measurement object, specifically by introducing, into an infrared detection element, infrared ray in a wavelength range of all the infrared ray emitted from the measurement object which does not pass through the measurement object, and by cutting off infrared ray in a wavelength range which passes through the measurement object.

With the above method, however, when the wavelength range that does not pass through the measurement object is narrow, a light quantity of infrared ray introduced into the infrared detection element may be decreased, and detection intensity may be lowered considerably.

It is possible to employ a method of increasing the light quantity introduced into the infrared detection element by using a large lens for improving detection sensitivity. This method requires a large radiation thermometer size, and there occurs a problem that it is difficult to cope with size restrictions of the radiation thermometer in a semiconductor manufacturing process or the like.

PRIOR ART DOCUMENT

Patent Document

Patent Document 1: Japanese Patent No. 2756648

SUMMARY OF THE INVENTION

Problems to be Solved by the Invention

Accordingly, the present invention has been made to solve the above problem at once, and has for its main object to make it possible to carry out highly accurate temperature measurement without increasing the radiation thermometer size even when the wavelength that does not pass through a measurement object is narrow.

Means of Solving the Problems

In one of embodiments, a radiation thermometer includes an infrared detection element to detect infrared ray emitted from a measurement object. The radiation thermometer is designed to measure a temperature of the measurement object on the basis of intensity of infrared ray detected by the infrared detection element. The radiation thermometer further includes a filter group made up of a plurality of infrared filters arranged on an optical path of infrared ray introduced into the infrared detection element. The filter group permits transmission of at least infrared ray in each of a first wavelength range and a second wavelength range which are not overlapped with each other.

With the radiation thermometer thus configured, the filter group that permits transmission of infrared ray in each of the first wavelength range and the second wavelength range which are not overlapped with each other is arrange on the optical path of infrared ray introduced into the infrared detection element. It is therefore possible to increase a light quantity introduced into the infrared detection element even when each of these wavelength ranges is narrow. Because this makes it possible to improve detection sensitivity without using a large lens or the like, highly accurate temperature measurement can be carried out without increasing the radiation thermometer size even when the wavelength that does not pass through a measurement object is narrow.

In order to highly accurately measure a temperature of a measurement object, the infrared ray in each of the first wavelength range and the second wavelength range preferably does not pass through the measurement object.

The term "not pass through" denotes not only "not passing through at all" but also "passing through somewhat to such a degree that measurement accuracy of the radiation thermometer can be ensured."

As a specific configuration of the filter group, the filter group includes a first infrared filter and a second infrared filter. The first infrared filter is designed to permit transmission of at least infrared ray in each of the first wavelength range and the second wavelength range, and designed to not permit transmission of infrared ray in a wavelength range between the first wavelength range and the second wavelength range. The second infrared filter is designed to permit transmission of infrared ray in a continuous wavelength range from the first wavelength range to the second wavelength range, and designed to not permit transmission of infrared ray in a wavelength range other than the continuous wavelength range.

The second infrared filter is preferably arranged closer to the infrared detection element than the first infrared filter.

With this configuration, even when infrared ray in a wavelength other than the continuous wavelength range is emitted from, for example, an inner wall of a casing that houses an infrared detection element therein, it is possible to prevent the infrared ray from being detected by the infrared detection element by cutting off the infrared ray with the use of the first infrared filter, thus leading to further improved measurement accuracy.

The first wavelength range is preferably 6.8 μm or more and 7.8 μm or less, and the second wavelength range is preferably 8.6 μm or more and 8.64 μm or less. An operation advantage of the present invention is remarkably achievable by measuring the temperature of isopropyl alcohol with the use of the radiation thermometer.

Effect of the Invention

With the present invention thus configured, highly accurate temperature measurement is achievable without increasing the radiation thermometer size even when a wavelength that does not pass through a measurement object, such as isopropyl alcohol, is narrow.

MODE FOR CARRYING OUT THE INVENTION

One of embodiments of a radiation thermometer in the present invention is described below with reference to the drawings.

Figure 1:
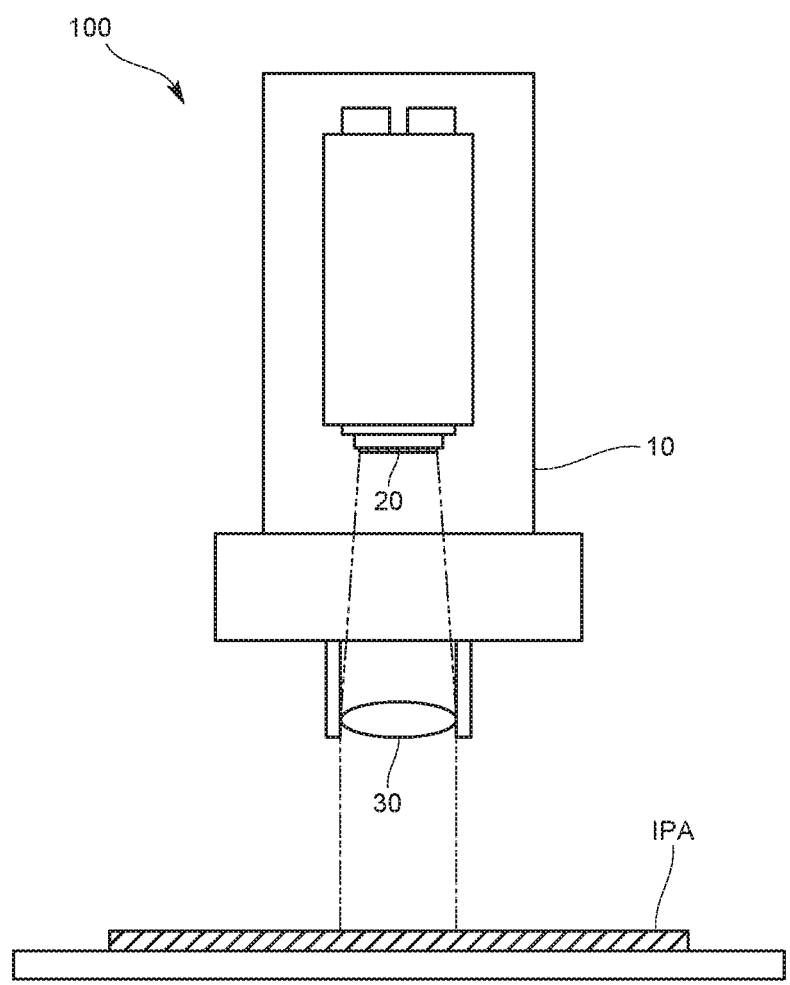
FIG. 1 is a schematic diagram illustrating a use state of a radiation thermometer in one of embodiments.

The radiation thermometer 100 of the present embodiment is intended for use in temperature measurement of a measurement object, such as liquid used in a semiconductor manufacturing process. Specifically, the radiation thermometer 100 is designed to measure a temperature of isopropyl alcohol (hereinafter referred to as "IPA") used in, for example, a drying process for semiconductors. As illustrated in FIG. 1, the IPA is dropped into a thin film shape having a thickness of, for example, 100 μm or less on a surface of a wafer being rotated. A sensor section of the radiation thermometer 100 is arranged above the wafer so as to be opposed to the thin film-shaped IPA. An amplification section (not illustrated), which is designed to perform, for example, arithmetic processing in the radiation thermometer 100, is a unit separate from the sensor section, and is coupled to the sensor section through an electric cable or the like.

Figure 2:
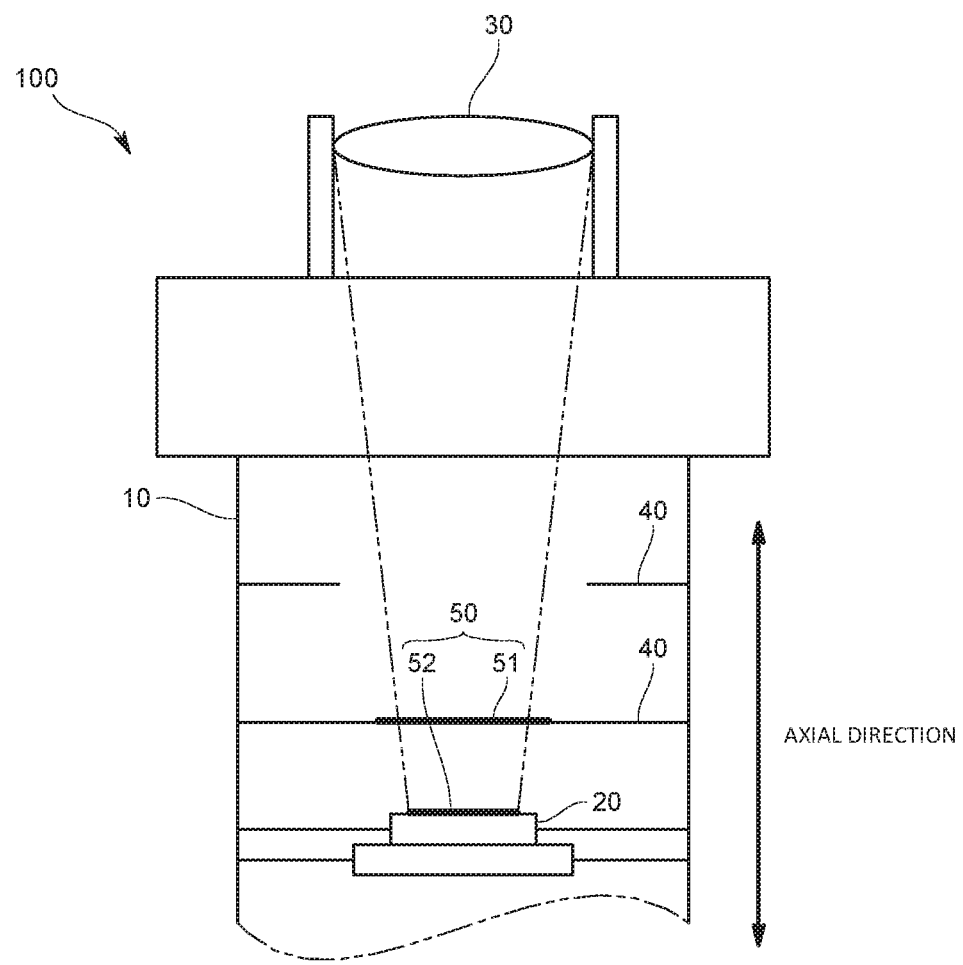
FIG. 2 is a schematic diagram illustrating a configuration of the radiation thermometer in the embodiment.

Specifically, the radiation thermometer 100 includes a casing 10, an infrared detection element 20 housed in the casing 10, and a lens 30 arranged between the infrared detection element 20 and a measurement object as illustrated in FIG. 2.

The casing 10 is formed into, for example, a tubular shape. The infrared detection element 20 is arranged at one end side in an axial direction in the interior of the casing 10, and the lens 30 is arranged at the other end side in the axial direction so as to be opposed to the infrared detection element 20. One or more apertures 40 are arranged between the infrared detection element 20 and the lens 30.

The infrared detection element 20 is designed to detect infrared ray emitted from the measurement object and output an intensity signal according to energy of the detected infrared ray. Specifically, the infrared detection element 20 is, for example, one which is designed to detect infrared ray over a full wavelength range in an infrared wavelength range, more specifically a thermal type one, such as a thermopile. Other type ones, for example, quantum photoelectric elements, such as HgCdTe, InGaAs, InAsSb, and PbSe, may be used as the infrared detection element 20.

The lens 30 is the IR lens 30 which is designed to collect infrared ray emitted from the measurement object into the infrared detection element 20, and which has, for example, an approximately circular shape with a diameter of approximately 10-22 mm in a top view. Shape and size of the lens 30 are not limited to the above, but may be changed suitably.

Figure 3:
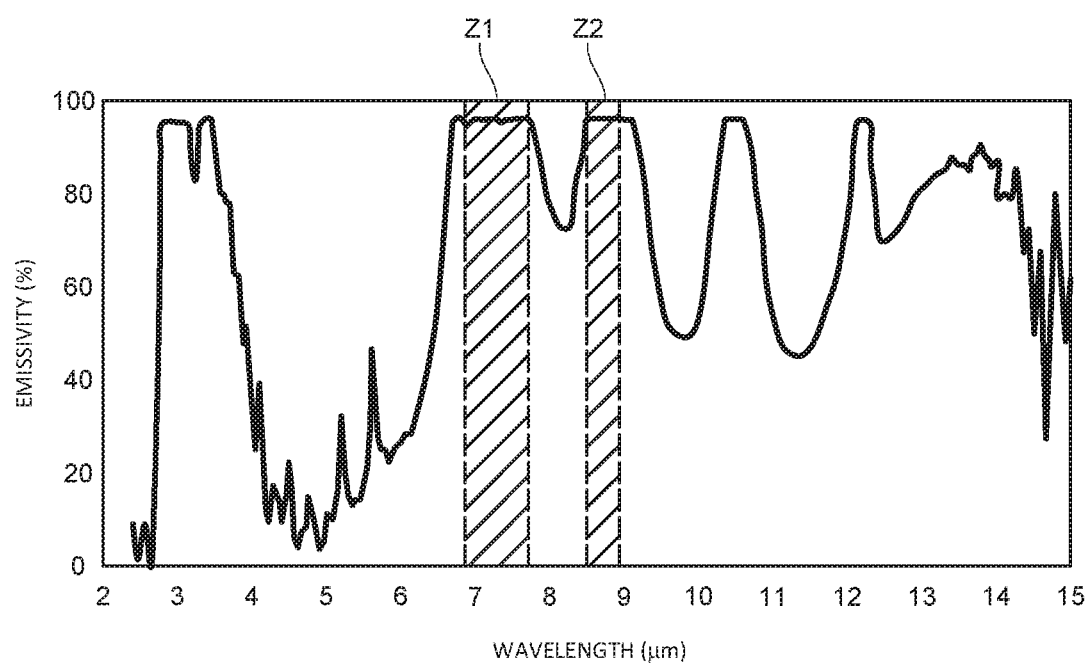
FIG. 3 is an emissivity spectrum of a measurement object in the embodiment.

Here, when light of a certain wavelength strikes an object, a sum of a reflection rate, a transmittance, and an absorption rate is 1, and the absorption rate is equal to an emissivity according to Kirchhoff's law. Alcohol has vibration modes caused by a molecular structure. Each of the vibration modes has an inherent wavelength range that absorbs much infrared ray, in other words, a wavelength range having a high emissivity. IPA has, as a vibration mode, symmetrical CH3 deformation vibration and C—OH stretching vibration of secondary alcohol. Due to these vibrations, a wavelength range having a high emissivity, in other words, a wavelength range that does not permit transmission (hereinafter referred to as "a non-transmission wavelength range) is present in an emissivity spectrum of IPA as illustrated in FIG. 3. The IPA in the present embodiment has at least two non-transmission wavelength ranges (hereinafter referred to as "a first non-transmission wavelength range Z1 and a second non-transmission wavelength range Z2") which are not overlapped with each other. The first non-transmission wavelength range Z1 and the second non-transmission wavelength range Z2 are discontinuous wavelength ranges. Infrared ray in each of the non-transmission wavelength ranges preferably does not pass through a filter group 50 at all. However, it does not matter if the infrared ray passes through somewhat to such a degree that measurement accuracy of the radiation thermometer 100 can be ensured.

Thus, the radiation thermometer 100 of the present embodiment includes the filter group 50 made up of a plurality of infrared filters interposed between the infrared detection element 20 and the lens 30 as illustrated n FIG. 2. The filter group 50 is designed to permit transmission of the infrared ray in each of the first non-transmission wavelength range Z1 and the second non-transmission wavelength range Z2.

More specifically, the filter group 50 in the present embodiment is made up of a first infrared filter 51 and a second infrared filter 52 which are different in transmission wavelength range. The filter group 50 is designed to permit transmission of infrared ray of 6.8 μm or more and 7.8 μm or less corresponding to the first non-transmission wavelength range Z1, and infrared ray of 8.6 μm or more and 8.64 μm or less corresponding to the second non-transmission wavelength range Z2.

The first infrared filter 51 is supported by, for example, the apertures 40 in the casing 10, and has a greater size than the second infrared filter 52 in the present embodiment.

The second infrared filter 52 is arranged closer to the infrared detection element 20 than the first infrared filter 51, specifically arranged close to the infrared detection element 20.

The first infrared filter 51 permits transmission of at least the infrared ray in each of the first non-transmission wavelength range Z1 and the second non-transmission wavelength range Z2, but does not permit transmission of infrared ray in a wavelength range between the first non-transmission wavelength range Z1 and the second non-transmission wavelength range Z2.

Figure 4:
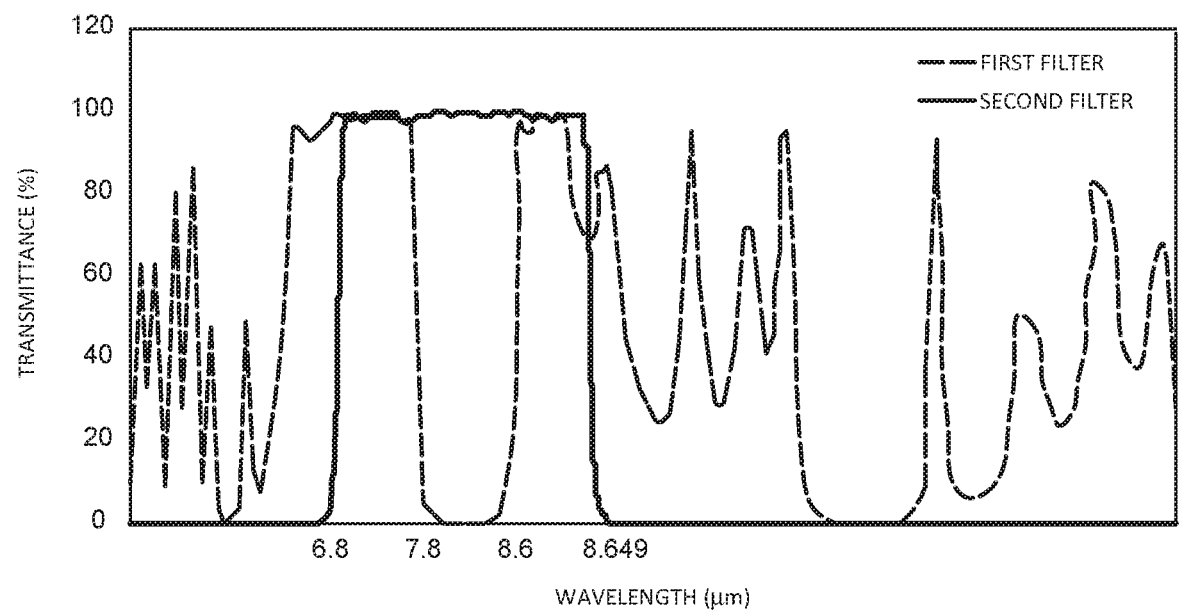
FIG. 4 is a diagram illustrating performances of a first infrared filter and a second infrared filter in the embodiment.
Figure 4:
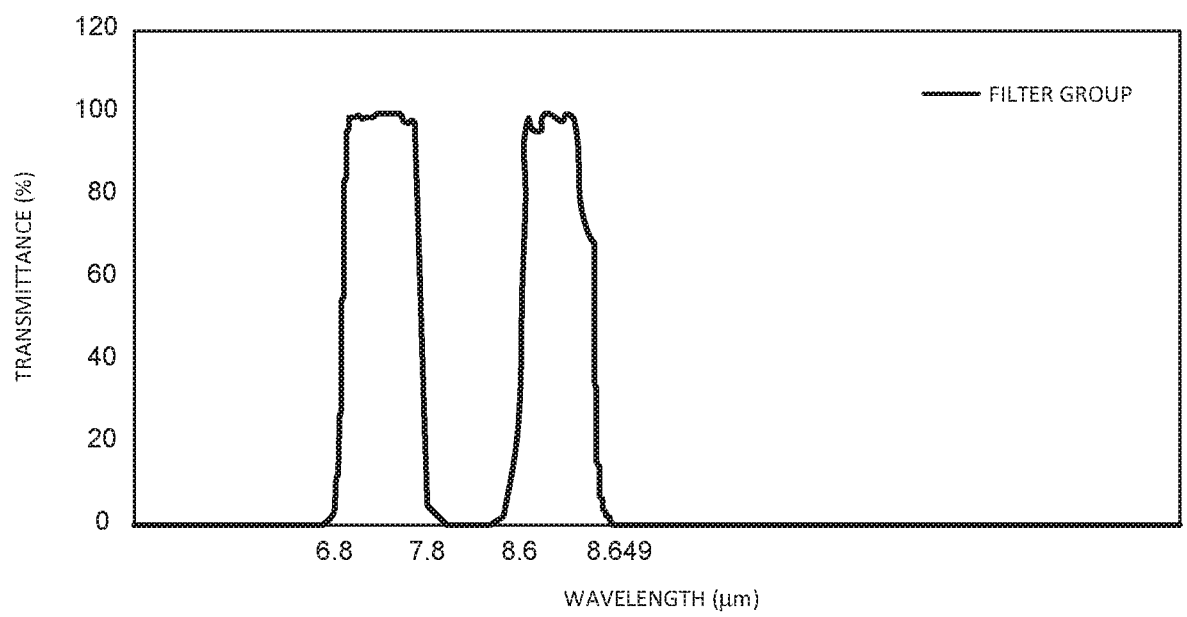

Specifically, as illustrated in an upper diagram in FIG. 4, the first infrared filter 51 is called a band-stop filter and permits transmission of the infrared ray of 6.8 μm or more and 7.8 μm or less corresponding to the first non-transmission wavelength range Z1, and infrared ray of 8.6 μm or more and 8.64 μm or less corresponding to the second non-transmission wavelength range Z2, but does not permit transmission of the infrared ray of wavelengths longer than 7.8 μm and shorter than 8.6 μm. The first infrared filter 51 has wavelengths that permit transmission of even wavelengths shorter than the first non-transmission wavelength range Z1 (wavelengths shorter than 6.8 μm) and wavelengths longer than the second non-transmission wavelength range Z2 (wavelengths longer than 8.64 μm).

The second infrared filter 52 permits transmission of infrared ray in a continuous wavelength range from the first non-transmission wavelength range Z1 to the second non-transmission wavelength range Z2, but does not permit transmission of infrared ray in a wavelength range other than the continuous wavelength range. Here, the continuous wavelength range is a wavelength range from a shortest wavelength of the first non-transmission wavelength range Z1 to a longest wavelength range of the second non-transmission wavelength range Z2. Although the continuous wavelength range includes all wavelength ranges of the first non-transmission wavelength range Z1 and the second non-transmission wavelength range Z2. The continuous wavelength range need not include a part on a short wavelength side of the first non-transmission wavelength range Z1 and a part on a long wavelength side of the second non-transmission wavelength range Z2.

Specifically, as illustrated in the upper diagram in FIG. 4, the second infrared filter 52 is an infrared filter called a broadband-stop filter which permits the infrared ray of 6.8 μm or more and 8.64 μm or less corresponding to the continuous wavelength range, and which does not permit transmission of infrared ray in a wavelength range other than the continuous wavelength range.

By overlapping the first infrared filter 51 and the second infrared filter 52, as illustrated in a lower diagram in FIG. 4, the filter group 50 in the present embodiment permits transmission of only the infrared ray of 6.8 μm or more and 7.8 μm or less and the infrared ray of 8.6 μm or more and 8.64 μm or less, but does not permit transmission of the infrared ray in a wavelength range other than these (namely, the infrared ray in a wavelength range other than the first non-transmission wavelength range Z1 and the second non-transmission wavelength range Z2). By arranging the filter group 50 on an optical path of infrared ray introduced into the infrared detection element 20, only the infrared ray of 6.8 μm or more and 7.8 μm or less and the infrared ray of 8.6 μm or more and 8.64 μm or less are detectable in the infrared detection element 20.

With the radiation thermometer 100 of the present embodiment thus configured, only the infrared ray of 6.8 μm or more and 7.8 μm or less and the infrared ray of 8.6 μm or more and 8.64 μm or less can be introduced into the infrared detection element 20 by the first infrared filter 51 and the second infrared filter 52. Hence, the temperature of IPA is measurable by detecting infrared ray in the non-transmission wavelength range which does not pass through the IPA. It is therefore possible to reduce measurement error because the filter group 50 cuts off infrared ray which is emitted from, for example, a member located on the opposite side of the radiation thermometer 100 PA across the IPA, and then passes through the IPA.

Figure 5:
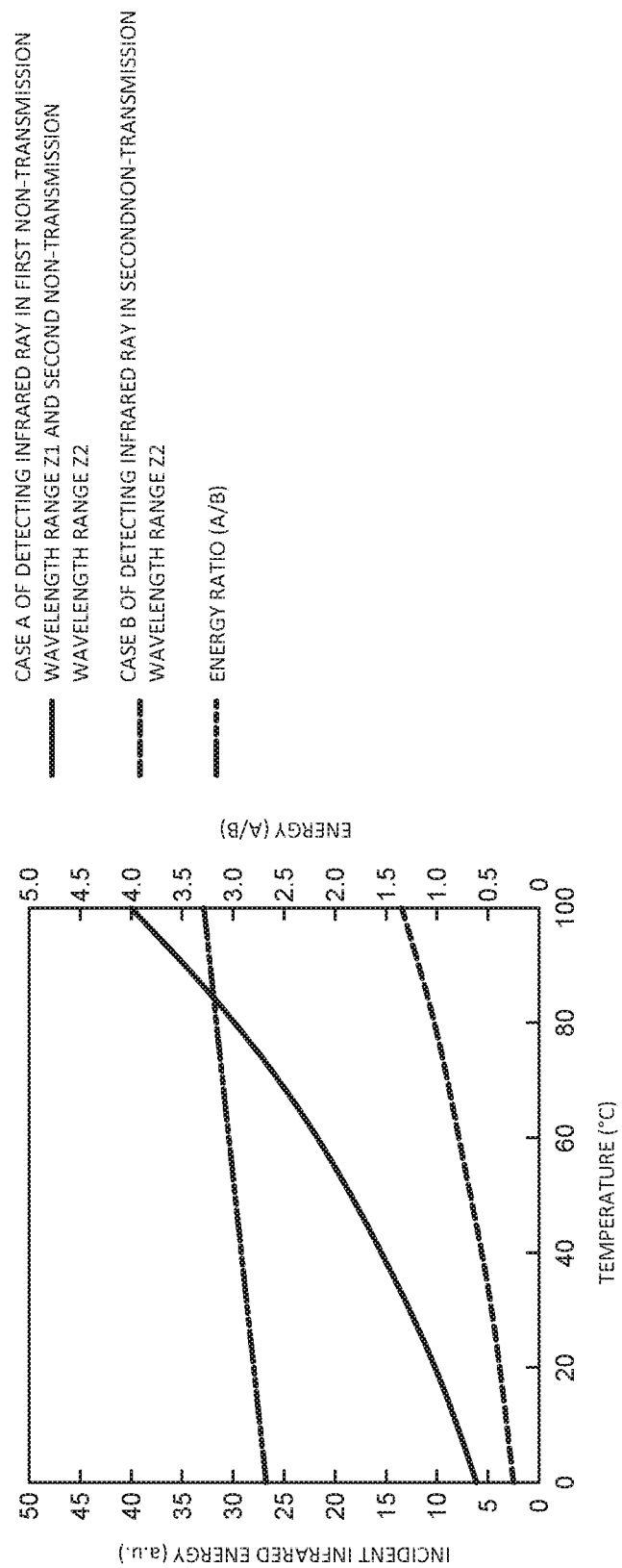
FIG. 5 is results of a test using a filter group in the embodiment.

Additionally, the use of both of the first non-transmission wavelength range Z1 and the second non-transmission wavelength range Z2 contributes to increasing a light quantity (incident energy) of infrared ray introduced into the infrared detection element 20 than the use of only one of these non-transmission wavelength ranges. FIG. 5 illustrates test results obtained from a comparison between the case A of detecting infrared ray in the first non-transmission wavelength range Z1 and the second non-transmission wavelength range Z2 by using the filter group 50 in the present embodiment, and the case B of detecting infrared ray in the second non-transmission wavelength range Z2. As apparent from the test results, the case A of using the filter group 50 in the present embodiment achieves approximately 2.3 times in a low temperature range and approximately 3.0 times in a high temperature range in terms of light quantity (incident energy) of the infrared ray, as compared with the case B of detecting the infrared ray in the second non-transmission wavelength range Z2. This makes it possible to improve detection sensitivity without using the large lens 30 or the like. The temperature of IPA can be measured highly accurately without increasing the size of the radiation thermometer 100 even in the case of having restriction in size of a radiation thermometer, for example, in a semiconductor manufacturing process.

Furthermore, because the second infrared filter 52 is arranged close to the infrared detection element 20, even when infrared ray of a wavelength shorter than 6.8 μm and infrared ray of a wavelength longer than 8.64 μm are emitted from, for example, an inner wall or the like of the casing 10, these infrared rays can be cut off by the second infrared filter 52, thereby further improving measurement accuracy.

The present invention is not limited to the above embodiment.

For example, the filter group 50 in the present embodiment is designed so as to permit transmission of only the infrared ray in the first non-transmission wavelength range Z1 and the second non-transmission wavelength range Z2. Alternatively, the filter group 50 may be designed so as to further permit transmission of infrared ray in a third non-transmission wavelength range besides the first non-transmission wavelength range Z1 and the second non-transmission wavelength range Z2.

The radiation thermometer 100 of the present invention is not limited to the temperature measurement of IPA, and is not intended to limit the measurement object to that in the above embodiment. Alternatively, another alcohol may be employed which has, as a vibration mode, symmetrical CH3 deformation vibration and C—OH stretching vibration of secondary alcohol.

Although the filter group 50 in the present embodiment is made up of the two infrared filters, the filter group 50 may be made up of three or more infrared filters.

The arrangement of the first infrared filter 51 and the second infrared filter 52 is not limited to that in the above embodiment. For example, the first infrared filter 52 may be arranged closer to the infrared detection element 20 than the second infrared filter.

The filter group 50 may be a single infrared filter in so far as it is possible to permit transmission of infrared ray in at least the first wavelength range and the second wavelength range which are not overlapped with each other.

It will be understood that the present invention is not limited to the above-described embodiments, and various modifications may be made without departing from the spirit and scope of the present invention.

DESCRIPTION OF THE REFERENCE NUMERAL 100 radiation thermometer
10 casing
20 infrared detection element
30 lens
50 filter group
51 first infrared filter
52 second infrared filter
Z1 first non-transmission wavelength range
Z2 second non-transmission wavelength range

What is claimed is:

1. A radiation thermometer comprising:
an infrared detector element to detect an infrared ray emitted from a measurement object, the radiation thermometer being configured to measure a temperature of the measurement object on a basis of an intensity of the infrared ray detected by the infrared detector element;
a casing in which the infrared detector element is housed; and
a filter group comprising a plurality of infrared filters fixed relative to the casing on an optical path of the infrared ray introduced into the infrared detector element, and the plurality of infrared filters at least partially overlap each other along the optical path, wherein
the infrared detector element is a thermal type infrared detector element,
the filter group permits transmission of at least the infrared ray in each of a first wavelength range and a second wavelength range which are not overlapped with each other, and
the filter group comprises:
a first infrared filter configured to permit transmission of at least the infrared ray in each of the first wavelength range and the second wavelength range and configured to not permit transmission of the infrared ray in a wavelength range between the first wavelength range and the second wavelength range; and
a second infrared filter configured to permit transmission of the infrared ray in a continuous wavelength range from the first wavelength range to the second wavelength range and configured to not permit transmission of the infrared ray in a wavelength range other than the continuous wavelength range.

2. The radiation thermometer according to claim 1, wherein the infrared ray in each of the first wavelength range and the second wavelength range does not pass through the measurement object.

3. The radiation thermometer according to claim 1, wherein the second infrared filter is arranged closer to the infrared detector element than the first infrared filter.

4. The radiation thermometer according to claim 1, wherein
the first wavelength range is 6.8 μm or more and 7.8 μm or less, and
the second wavelength range is 8.6 μm or more and 8.64 μm or less.

5. The radiation thermometer according to claim 1, wherein the radiation thermometer is configured to measure a temperature of isopropyl alcohol.

6. The radiation thermometer according to claim 1, wherein the radiation thermometer comprises only a single infrared detection element that is the infrared detector detection element.

* * * * *